(12) United States Patent
Orentlicher et al.

(10) Patent No.: US 9,452,938 B2
(45) Date of Patent: Sep. 27, 2016

(54) AMMONIA CAPTURE RECOVERY SYSTEM

(71) Applicants: Morton Orentlicher, New York, NY (US); Mark Simon, Wilbraham, MA (US)

(72) Inventors: Morton Orentlicher, New York, NY (US); Mark Simon, Wilbraham, MA (US)

(*) Notice: Subject to any disclaimer, the term of this patent is extended or adjusted under 35 U.S.C. 154(b) by 154 days.

(21) Appl. No.: 14/299,898

(22) Filed: Jun. 9, 2014

(65) Prior Publication Data
US 2014/0363344 A1    Dec. 11, 2014

Related U.S. Application Data

(60) Provisional application No. 61/832,950, filed on Jun. 9, 2013.

(51) Int. Cl.
| | |
|---|---|
| *C02F 1/04* | (2006.01) |
| *C02F 1/20* | (2006.01) |
| *C02F 1/44* | (2006.01) |
| *C02F 1/66* | (2006.01) |
| *B01D 53/22* | (2006.01) |
| *B01D 53/58* | (2006.01) |
| *C01C 1/24* | (2006.01) |
| *C01C 1/28* | (2006.01) |
| *C05F 7/00* | (2006.01) |
| *C05C 3/00* | (2006.01) |
| *C01C 1/242* | (2006.01) |

(52) U.S. Cl.
CPC ............ *C01C 1/242* (2013.01); *B01D 53/226* (2013.01); *B01D 53/227* (2013.01); *B01D 53/229* (2013.01); *B01D 53/58* (2013.01); *C01C 1/28* (2013.01); *C02F 1/04* (2013.01); *C02F 1/20* (2013.01); *C02F 1/44* (2013.01); *C02F 1/66* (2013.01); *C05C 3/00* (2013.01); *C05F 7/00* (2013.01); *B01D 2257/406* (2013.01); *Y02W 30/47* (2015.05)

(58) Field of Classification Search
CPC .......... C01C 1/242; C01C 1/28; C02F 1/20; C02F 1/04; C02F 1/66; C02F 3/00; C02F 3/02; C02F 9/00; C02F 2101/16; C02F 2103/20; C02F 1/44; C02F 1/441; C02F 1/442; C02F 1/445; C02F 1/447; C02F 1/448; C05C 3/00; C05F 7/00; Y02W 30/47; B01D 53/225; B01D 53/226; B01D 53/227; B01D 53/229; B01D 53/58; B01D 2257/406
See application file for complete search history.

(56) References Cited

U.S. PATENT DOCUMENTS 9,005,333 B1 *  4/2015  Vanotti ................... C02F 1/448
                                                        210/259
2006/0006055 A1 *  1/2006  Bonde ....................... C02F 1/20
                                                        203/73

(Continued)

*Primary Examiner* — Lucas Stelling

(57) ABSTRACT

An ammonia capture recovery system is disclosed. The ammonia capture recovery system may include pretreatment with conventional solid removal devices and a single or a series of hydrophobic membrane concentrators receiving a heated ammonium containing influent either heated to a sufficient temperature to convert ammonia to ammonium or containing sufficient alkali to convert ammonia to ammonium in the influent. The heated ammonium containing liquid is pumped through the hydrophobic membrane concentrator and the hydrophobic membrane concentrator receives an acid. The acid then reacts with the extracted gaseous ammonia and ultimately forms a saturated ammonium salt product that is discharged from the hydrophobic membrane concentrator, the hydrophobic membrane concentrator includes a feed line, a plurality of hydrophobic membrane modules, a diluted acid source and a concentrated acid source and tanks to receive the saturated ammonium salt product and the low ammonia effluent.

20 Claims, 2 Drawing Sheets

(56) References Cited

U.S. PATENT DOCUMENTS

2010/0219124 A1* 9/2010 Van Slyke .............. C05F 3/00 210/603

2011/0229403 A1* 9/2011 Szogi .................... C01C 1/242 423/549

* cited by examiner

AMMONIA CAPTURE RECOVERY SYSTEM

This application claims priority to U.S. Provisional Application 61/832,950 filed on Jun. 9, 2013, the entire disclosure of which is incorporated by reference.

BACKGROUND OF THE INVENTION

1. Field of the Invention

The present invention is a recovery system. More specifically, the present invention is an ammonia capture recovery system.

2. Description of the Related Art

Wastewater streams rich in the nutrients nitrogen and phosphorus are produced by municipal, industrial, and agricultural processes. These nutrients are present in various forms: partially bound to solids and not immediately available to the ambient air and water, and in water soluble forms (phosphate, nitrate, ammonia, organic nitrogen), and in the case of ammonia in a volatile gas form.

All three categories are present in anaerobic digestion effluent known as digestate. The soluble and volatile forms of these elements are particularly prone to loss pathways and pose a variety of environmental and human health threats.

Ammonia that is captured and fixed chemically may be utilized in agriculture as fertilizer or industrially as a process chemical. The liquid product of digestion of organic waste, or digestate frequently contains relatively high concentrations of dissolved ammonia in the form of ammonia gas and ammonium ion. Nitrogen in these forms, ammonia or ammonium, is termed $NH_3$—N. Ammonia from a liquid digestate may be readily diffused from the liquid digestate and converted to a chemical fertilizer which provides a uniform, high purity, concentrated source of $NH_3$—N. As with synthetic fertilizer, the material is nearly odorless and has low transport and application costs relative to manure and the liquid digestate.

Ammonia stripping from wastewater through the utilization of hot air and steam is well established. These methods generally employ industrial acid to capture the stripped ammonia, where normally sulfuric acid is utilized. The utilization of acids is highly effective in both ammonia recovery and in producing a concentrated ammonium salt product. However the stripping methods involve utilization of relatively large and expensive vessels and substantial inputs of thermal and electrical energy to liberate the ammonia. It would be advantageous to utilize a combination of filtration methods to separate the digestate ammonium from particulate and colloidal solids and organic solutes and efficient utilization of hydrophobic membranes to capture the ammonia as technical grade ammonium salt to greatly reduce these negative attributes of conventional ammonia stripping.

BRIEF SUMMARY OF THE INVENTION

The present invention is a recovery system. More specifically, the present invention is an ammonia capture recovery system.

The present invention is primarily designed for ammonia-nitrogen recovery from organic waste such as animal manure, food waste, and municipal sludge and leachate. While manure is the generic term for urinary and fecal excreta of domestic farm animals, the source of the manure (dairy, swine, poultry and others) and the conditions of both its generation and treatment vary considerably. Typically, industrial wastewaters are less complex than the agricultural wastewaters. The latter are the focus of the present invention, but that does not imply that the present invention is limited in its application to agricultural wastewaters.

The ammonia capture recovery system may recover ammonium based fertilizer such as ammonium sulfate, ammonium nitrate, ammonium citrate or ammonium acetate, depending on the acid utilized to react with ammonia, and the ammonia is derived from ammonium in one or more wastewaters and one or more dilute sludges containing ammonium, utilizing a hydrophobic membrane process to transfer the ammonia from the waste to the acid. The following description focuses on a specific category of wastewater or sludge, the liquid product of anaerobic digestion known as digestate.

The prior art does not provide for a cost-effective method to separate the ammonia from the digestate and recover a high purity, ammonium fertilizer product. The present invention represents a cost-effective method to separate the ammonia and carbon dioxide from the digestate and recover a high purity, ammonium fertilizer product. The biogas produced by modern anaerobic digestion methods is approximately sixty percent methane and approximately forty percent carbon dioxide. Nearly all of the digested carbon is accounted for in the biogas, with the majority of the remaining carbon in the solid effluent. The design carbon to nitrogen ratio for anaerobic digestion is approximately 25:1, and the digestate contains most of the nitrogen in the form of ammonium ion in the liquid digestate. A small fraction of the digested carbon is also in solution and in balance with the ammonium as bicarbonate. Since digestate is generally at a pH slightly above neutral, nearly all the soluble carbon is in bicarbonate form and the soluble $NH_3$—N is in ammonium form.

Production of treated digestate with very low total suspended solids or TSS, including all pre-processing of waste, anaerobic digestion, coarse solids separation and fine solids separation may be necessary pretreatments for the present invention. Most of the phosphorus will be discharged with the fine solids stream.

To minimize chemical cost in a commercial implementation, it may be desirable to lower alkalinity in the digestate prior to ammonia removal. Degassing of the liquid digestate at digestion temperature and neutral pH to remove most of the carbon dioxide will raise the pH of the digestate to approximately 8.6. The methods of pre-treatment are known to those skilled in the art of separation of gases from wastewaters.

Addition of sufficient alkali to raise the pH to approximately 10.5 and sufficient heat to raise the temperature in the approximate range of 40 C.° to 50 C.° prior to injection into the one or more ammonia recovery membrane modules, or sufficient heat to raise the temperature to approximately 80 C.° in the absence of added alkali, is necessary to produce ammonia gas from the ammonium ion in digestate, and to promote transport of ammonia gas from the digestate across the membranes in the ammonia removal operation. The membrane unit operation involves dividing the digestate flow into N parallel streams, each of which lose approximately 80% to 90% of the $NH_3$—N across the membranes in a hydrophobic membrane module and pumping a continuous stream of acid and ammonium salt countercurrent to the digestate flow through the N membrane modules.

The first module is provided with concentrated acid influent on the acid-side of the membrane to minimize addition of water and consequent dilution of the absorbed $NH_3$—N. Sufficient acid is added between the modules so that the absorption stream enters the downstream module at a pH of approximately 0.5 and exits at a pH of approximately 1.5. At the end of the process, the ammonium salt stream should be stored at a pH of approximately 6 and be nearly saturated with the ammonium salt. The ammonia-depleted digestate (post the hydrophobic membrane modules) will be a low nutrient stream that may be utilized as process water or be land applied. The concentrated ammonium salt product may be stored as a nitrogen-fertilizer or be crystallized and sold as a commercial solid nitrogen-fertilizer or industrial chemical.

It is an object of the present invention to provide a system and method for producing ammonium based fertilizer or industrial chemical from wastewater that focuses on capture of ammonia from the liquid waste product or digestate of anaerobic digestion with subsequent chemical conversion to ammonium fertilizer.

It is an object of the present invention to provide a system and method for producing ammonium based fertilizer or industrial chemical from wastewater that applies several membrane technologies in which the ammonia is captured with an industrial acid after being liberated from the digestate with application of high temperature or caustic or other industrial alkali.

BRIEF DESCRIPTION OF THE DRAWINGS

The present invention will be described by way of exemplary embodiments, but not limitations, illustrated in the accompanying drawing in which like references denote similar elements, and in which.

DETAILED DESCRIPTION OF ILLUSTRATIVE EMBODIMENTS

Various aspects of the illustrative embodiments will be described utilizing terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is utilized repeatedly. The phrase generally does not refer to the same embodiment, however, it may. The terms "comprising", "having" and "including" are synonymous, unless the context dictates otherwise.

Figure 1:
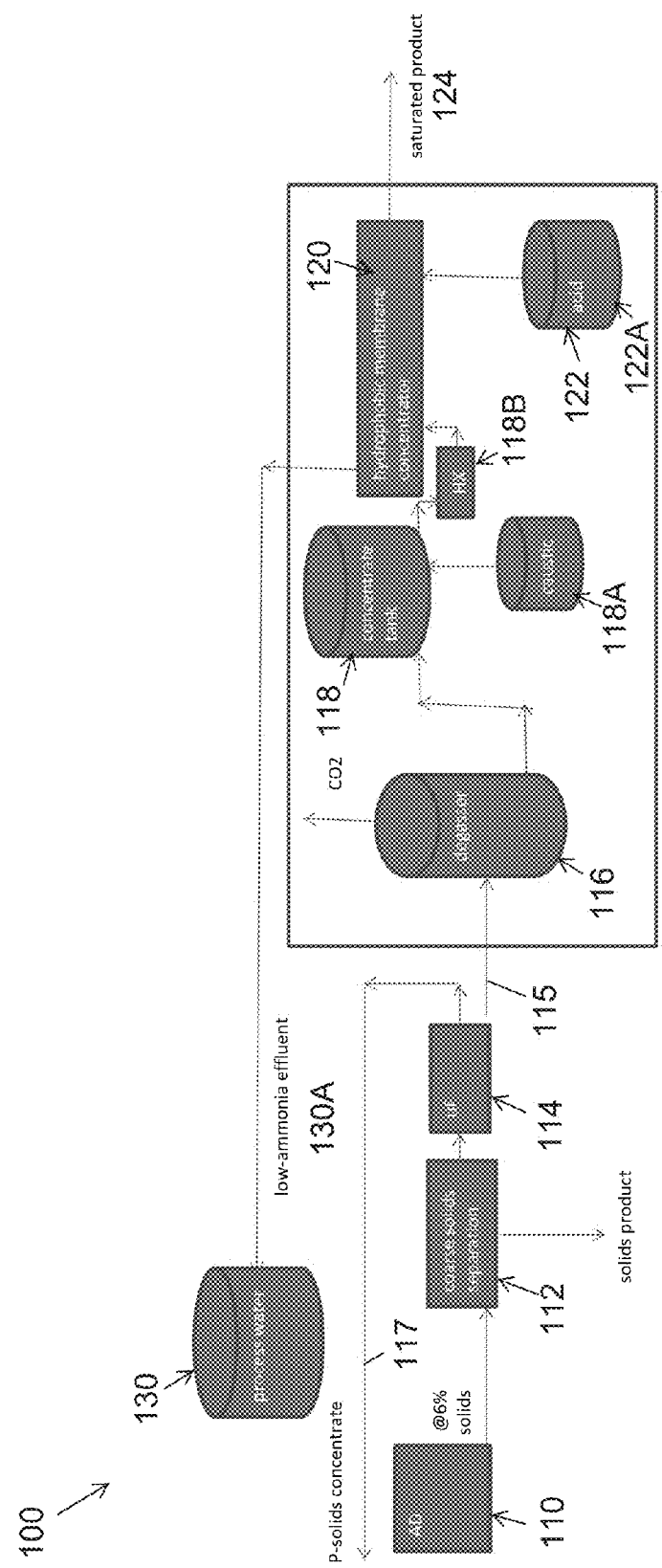
FIG. 1 illustrates a block diagram of an ammonia capture recovery system, in accordance with one embodiment of the present invention.

FIG. 1 illustrates a block diagram of an ammonia capture recovery system, in accordance with one embodiment of the present invention. FIG. 1 illustrates one or more required unit operations and process flows for an ammonium containing stream.

The ammonia capture recovery system includes an anaerobic digester pre-processed initially by coarse solids separation that separates out a plurality of solids products that include a plurality of coarse solids, the digestate is then pre-processed by an ultra-filter or similar device to separate out fine solids concentrate, the ultra-filter then pumps the liquid product, permeate, to a degasser, the degasser then removes carbon dioxide from the anaerobic digester and forwards the remaining permeate to a concentration tank, an alkali is added to the concentration tank and the permeate is pumped into a heat exchanger. The system includes a hydrophobic membrane and the heated permeate is pumped through the hydrophobic membrane concentrator on one side of the membrane, the hydrophobic membrane concentrator receives an acid that is pumped into the hydrophobic membrane concentrator on the other side of the membrane, the acid forms a saturated ammonia product that is effluent from the hydrophobic membrane concentrator, the hydrophobic membrane concentrator includes a feed line, a plurality of hydrophobic membrane modules, an acid source, a concentrated acid source and a saturated product line. The system also includes a process water tank receiving a low ammonia effluent pumped from the hydrophobic membrane concentrator.

The system 100 may include an anaerobic digester 110, a hydrophobic membrane concentrator 120 and a process water tank 130. The anaerobic digester 110 effluent may be approximately 6 percent solids or other suitable percentage. The anaerobic digester 110 effluent may be pre-processed initially by coarse solids separation 112 that separates a low-solids liquid or pressate from one or more solids products such as coarse solids or other suitable solids products contained within a slurry. The pressate may then be pre-processed by an ultra-filter 114 or other suitable device to separate out fine solids concentrate 117. A permeate 115 may then be transferred (FIG. 2, 210A) to a degasser 116. The degasser 116 may then remove carbon dioxide from the permeate 115 and forward the remaining permeate 115 to a concentration tank 118. A caustic source 118A may add alkali to the concentration tank 118. The alkali may be sodium carbonate or sodium hydroxide to raise the pH to approximately 10.5 or other suitable pH. The permeate (FIG. 2, 210A) may then be processed by a heat exchanger 118B that may provide sufficient heat to raise the temperature to approximately 50 C.° or other suitable temperature.

Figure 2:
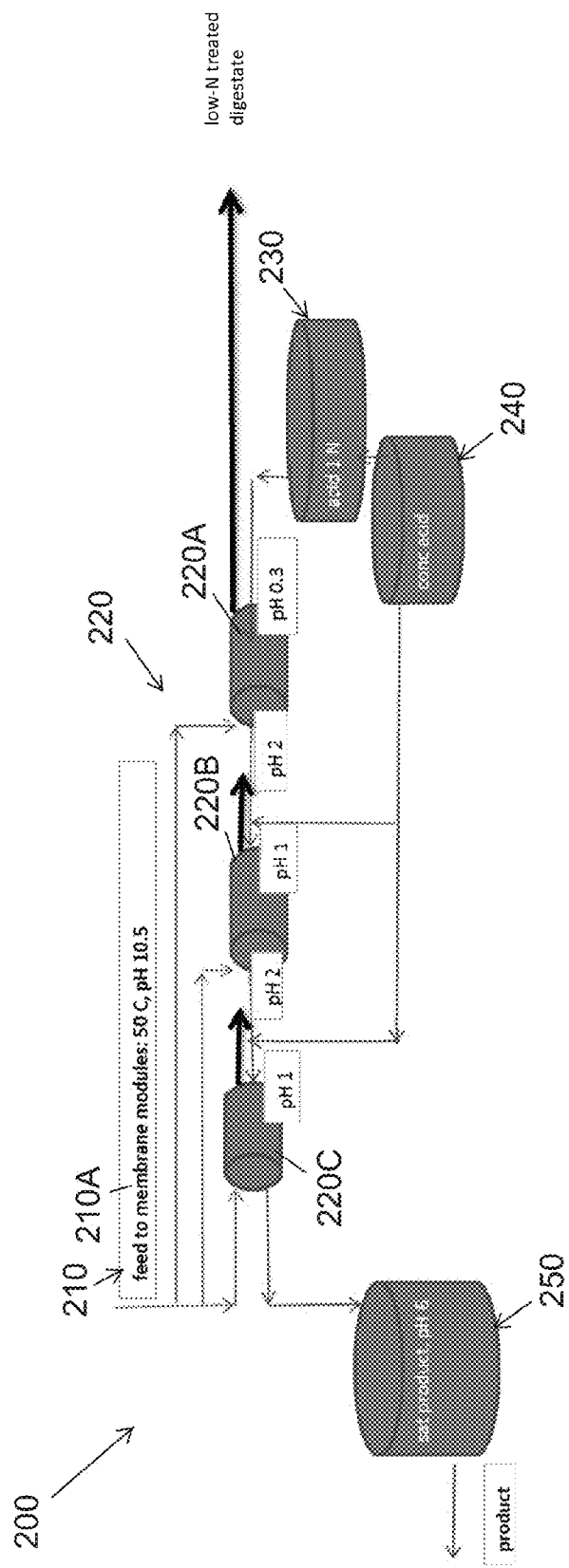
FIG. 2 illustrates a block diagram of a hydrophobic membrane concentrator, in accordance with one embodiment of the present invention.

The hydrophobic membrane concentrator 120 may receive the heated permeate (FIG. 2, 210A) that may be pumped through each module of the hydrophobic membrane concentrator 120. The hydrophobic membrane concentrator 120 may receive an acid 122 such as sulfuric acid 122A or other suitable acid that may be pumped sequentially through the modules of the hydrophobic membrane concentrator 120. Additional acid may be injected into an acid line between adjacent hydrophobic membrane modules (FIG. 2, 220). The acid 122 may form a saturated ammonia product 124 that may be expelled from the hydrophobic membrane concentrator 120. The process water tank 130 may also receive a low ammonia effluent 130A pumped from the hydrophobic membrane concentrator 120.

FIG. 2 illustrates a block diagram of a hydrophobic membrane concentrator 200, in accordance with one embodiment of the present invention.

The hydrophobic membrane concentrator 200 may include a feed line 210, a plurality of hydrophobic membrane modules 220, an acid source 230, a concentrated acid source 240 and a saturated product 250. The feed line 210 may contain permeate 210A. FIG. 2 illustrates three membrane modules 220 however any suitable number of membrane modules 220 may be utilized. The number of membrane modules 220 required may depend on the concentration of ammonium in an influent stream. More concentrated ammonium bearing streams may require fewer hydrophobic membrane modules 220 to achieve a desired degree of product saturation in the effluent of the acid stream. The acid source 230 may pump acid into a first hydrophobic membrane module 220A. The acid source 230 may pump sulfuric acid or any suitable acid into the first hydrophobic membrane module 220A. The concentrated acid source 240 may pump concentrated acid to the acid source 230 to form the acid and to a second hydrophobic membrane module 220B and a third hydrophobic membrane module 220C. The saturated product 250 may be formed by the permeate 210A and the acid source 230 being pumped through the hydrophobic membrane modules 220. The saturated product 250 may have a pH of approximately 6 or other suitable pH.

The system and method divides the permeate flow into one or more parallel streams. Each parallel stream may be delivered to a single hydrophobic membrane module wherein the permeate loss across the hydrophobic membrane is approximately in the range of 80% to 90% of the ammonia gas. A continuous stream of ammonium salt and acid may run countercurrent through the one or more membrane modules.

The first module of the membrane concentrator has a high concentration of acid on the acid-side of the membrane to minimize dilution of the $NH_3$—N, with sufficient acid added between the modules so that the ammonium salt enters the downstream module at an approximate pH of 0.5 and exits at an approximate pH of 1.5. At the end of the process, the ammonium salt stream should be saturated and stored at an approximate pH of 6. The ammonia-depleted digestate will be a low nutrient stream that may be utilized as process water or be land applied. The ammonium salt may be stored as a liquid nitrogen-fertilizer or be crystallized and sold as a commercial solid nitrogen-fertilizer or industrial chemical.

A second embodiment adds heat rather than alkali to the permeate. At sufficiently high temperatures such as at approximately at least 70 C.° and preferably at least 80 C.°, the equilibrium between ammonium ion and ammonia gas may be shifted to the ammonia form without addition of alkali. The heated permeate is then pumped to the feed line, FIG. 2, 210, and is processed in hydrophobic membrane modules, FIG. 2, 220 as described for the first embodiment.

The ammonia capture recovery system was tested by estimation of the cost of membrane modules for a specific moderate flow and ammonia concentration feed. This is not an optimized example and may be intended to test the potential value by calculating the cost of the central elements of the system, which are the membrane modules. Calculations are based on current costs for polypropylene membranes, which may be the least costly material for hydrophobic filtration modules. Installed cost will be situation-specific and likely a straight forward multiple of the module cost. However, the module cost may be sufficiently low and the installation may be uncomplicated compared to current stripping methodologies. Based on empirical calculations, the system and method represents a low cost mode of ammonia recovery from digestate or similar wastewaters.

While the present invention has been related in terms of the foregoing embodiments, those skilled in the art will recognize that the present invention is not limited to the embodiments described. The present invention may be practiced with modification and alteration within the spirit and scope of the appended claims. Thus, the description is to be regarded as illustrative instead of restrictive on the present invention.

The invention claimed is:

1. An ammonia capture recovery system for a pre-processed wastewater solution permeate having $NH_3$—N, comprising:
    a source of a pre-processed wastewater solution permeate having $NH_3$—N and a low solids concentration,
    a degasser, the degasser receives the wastewater solution permeate and removes carbon dioxide from the wastewater solution permeate,
    a concentration tank and an alkali source, the concentration tank receives the wastewater solution permeate from the degasser and alkali is added to the concentration tank and resulting high pH of the wastewater solution permeate converts ammonium to ammonia to form a reacted permeate
    a hydrophobic membrane concentrator, the hydrophobic membrane concentrator comprising a plurality of hydrophobic membrane modules with all acid sides of the modules connected in series to define a continuous acid-side stream, a permeate feed line that divides a flow of the reacted permeate via a plurality of permeate lines that are each delivered to a separate hydrophobic membrane module, an acid source having a plurality of acid supply lines that are each delivered to a separate acid-side input of each hydrophobic membrane module to maintain the acidity of the continuous acid-side stream, and a saturated product tank; and
    a process water tank receiving a low ammonia effluent pumped from the hydrophobic membrane concentrator, wherein
    acid pumped into the hydrophobic membrane concentrator reacts with ammonia transferred across each membrane module from the reacted permeate to form a saturated ammonium product in the acid-side stream that is transferred to the saturated product tank.

2. The ammonia capture recovery system according to claim 1, wherein the alkali is sodium carbonate.

3. The ammonia capture recovery system according to claim 1, wherein the alkali is sodium hydroxide.

4. The ammonia capture recovery system according to claim 1, wherein the alkali raises a pH of the permeate to shift an ammonium and ammonia equilibrium in favor of ammonia gas.

5. The ammonia capture recovery system according to claim 1, wherein the acid is sulfuric acid.

6. The ammonia capture recovery system according to claim 1, wherein the pre-processed wastewater solution permeate is a pre-processed anaerobic digestate.

7. The ammonia capture recovery system according to claim 1, wherein the acid source pumps acid to an acid-side feed tank and then into a first hydrophobic membrane module via a first line of the plurality of acid supply lines.

8. The ammonia capture recovery system according to claim 7, wherein the acid source pumps concentrated acid to each of the hydrophobic membrane modules after the first hydrophobic membrane module via an additional line or lines of the plurality of acid supply lines.

9. The ammonia capture recovery system according to claim 1, wherein the saturated product has a pH of 6.

10. The ammonia capture recovery system according to claim 1, wherein the ammonia capture recovery system produces an ammonium based fertilizer selected from the group consisting of ammonium sulfate, ammonium nitrate, ammonium citrate, ammonium acetate, or an ammonium salt of an acid.

11. The ammonia capture recovery system according to claim 1, wherein the low ammonia effluent is disposed of or land applied.

12. An ammonia capture recovery system for a pre-processed wastewater solution permeate having $NH_3$—N, comprising:
  - a source of a pre-processed wastewater solution including $NH_3$—N and a low solids concentration,
  - a heat exchanger, the heat exchanger heats the wastewater solution permeate to form a heated permeate,
  - a hydrophobic membrane concentrator, the hydrophobic membrane concentrator comprising a plurality of hydrophobic membrane modules with all acid sides of the modules connected in series to define a continuous acid-side stream, a permeate feed line that divides a flow of the heated permeate via a plurality of permeate lines that are each delivered to a separate hydrophobic membrane module, an acid source having a plurality of acid supply lines that are each delivered to a separate acid-side input of each hydrophobic membrane module to maintain the acidity of the continuous acid-side stream, and a saturated product tank; and
  - a process water tank receiving a low ammonia effluent pumped from the hydrophobic membrane concentrator, wherein the low ammonia effluent is disposed of or land applied, and acid pumped into the hydrophobic membrane concentrator reacts with ammonia transferred across each membrane module from the heated permeate to form a saturated ammonium product that is transferred to the saturated product tank.

13. The ammonia capture recovery system according to claim 12, wherein the heat added raises a permeate temperature to shift an ammonium and ammonia equilibrium in favor of ammonia gas.

14. The ammonia capture recovery system according to claim 12, wherein the heat exchanger provides heat to 80 C to convert the ammonium to ammonia.

15. The ammonia capture recovery system according to claim 12, wherein the acid is sulfuric acid.

16. The ammonia capture recovery system according to claim 12, wherein the pre-processed wastewater solution permeate is a pre-processed anaerobic digestate permeate.

17. The ammonia capture recovery system according to claim 12, wherein the acid source pumps acid to an acid-side feed tank and then into a first hydrophobic membrane module via a first line of the plurality of acid supply lines.

18. The ammonia capture recovery system according to claim 17, wherein the acid source pumps concentrated acid to each of the modules after the first hydrophobic membrane module via an additional line or lines of the plurality of acid supply lines.

19. The ammonia capture recovery system according to claim 12, wherein the saturated product has a pH of 6.

20. The ammonia capture recovery system according to claim 12, wherein the ammonia capture recovery system processes an ammonium based fertilizer selected from the group consisting of ammonium sulfate, ammonium nitrate, ammonium citrate or ammonium acetate, or an ammonium salt of an acid.

* * * * *